(12) United States Patent
Okada et al.

(10) Patent No.: US 9,381,464 B2
(45) Date of Patent: Jul. 5, 2016

(54) FACILITATED $CO_2$ TRANSPORT MEMBRANE AND METHOD FOR PRODUCING SAME, AND METHOD AND APPARATUS FOR SEPARATING $CO_2$

(71) Applicant: Renaissance Energy Research Corporation, Kyoto (JP)

(72) Inventors: Osamu Okada, Kyoto (JP); Nobuaki Hanai, Kyoto (JP); Peng Yan, Kyoto (JP); Junya Miyata, Kyoto (JP); Yasato Kiyohara, Kyoto (JP); Sayaka Ishii, Kyoto (JP); Megumi Nagano, Kyoto (JP)

(73) Assignee: RENAISSANCE ENERGY RESEARCH CORPORATION, Kyoto (JP)

( * ) Notice: Subject to any disclaimer, the term of this patent is extended or adjusted under 35 U.S.C. 154(b) by 0 days.

(21) Appl. No.: 14/412,192

(22) PCT Filed: Oct. 1, 2013

(86) PCT No.: PCT/JP2013/076665
§ 371 (c)(1),
(2) Date: Dec. 30, 2014

(87) PCT Pub. No.: WO2014/054619
PCT Pub. Date: Apr. 10, 2014

(65) Prior Publication Data
US 2015/0151243 A1    Jun. 4, 2015

(30) Foreign Application Priority Data

Oct. 2, 2012 (JP) ................................. 2012-220250

(51) Int. Cl.
*B01D 53/22* (2006.01)
*C01B 3/58* (2006.01)
(Continued)

(52) U.S. Cl.
CPC .......... *B01D 53/228* (2013.01); *B01D 67/0009* (2013.01); *B01D 69/12* (2013.01); *B01D 69/142* (2013.01); *B01D 69/145* (2013.01); *B01D 71/76* (2013.01); *B01J 20/043* (2013.01);
(Continued)

(58) Field of Classification Search
USPC .......................................................... 423/658
See application file for complete search history.

(56) References Cited

U.S. PATENT DOCUMENTS 4,117,079 A * 9/1978 Bellows .................... 423/223
2011/0036237 A1 * 2/2011 Okada et al. ................ 95/51

FOREIGN PATENT DOCUMENTS

JP     2009195900 A     9/2009
WO     2009093666 A1    7/2009
WO     WO 2009093666 A1 * 7/2009

*Primary Examiner* — Melvin C Mayes
*Assistant Examiner* — Kenneth Vaden
(74) *Attorney, Agent, or Firm* — Haynes Beffel & Wolfeld LLP

(57) ABSTRACT

Provided is a facilitated $CO_2$ transport membrane having an improved $CO_2$ permeance and an improved $CO_2/H_2$ selectivity. The facilitated $CO_2$ transport membrane includes a separation-functional membrane that includes a hydrophilic polymer gel membrane containing a $CO_2$ carrier and a $CO_2$ hydration catalyst. Further preferably, the $CO_2$ hydration catalyst at least has catalytic activity at a temperature of 100° C. or higher, has a melting point of 200° C. or higher, or is soluble in water.

16 Claims, 9 Drawing Sheets

(51) Int. Cl.
*B01D 67/00* (2006.01)
*B01D 69/12* (2006.01)
*B01D 69/14* (2006.01)
*B01D 71/76* (2006.01)
*B01J 20/04* (2006.01)
*B01J 20/26* (2006.01)
*B01J 20/28* (2006.01)
*B01J 20/32* (2006.01)
*B01J 23/04* (2006.01)
*B01J 23/18* (2006.01)
*B01J 27/057* (2006.01)
*B01D 71/38* (2006.01)
*B01D 71/40* (2006.01)
*B01D 71/36* (2006.01)

(52) U.S. Cl.
CPC ......... *B01J 20/265* (2013.01); *B01J 20/28047* (2013.01); *B01J 20/3231* (2013.01); *B01J 23/04* (2013.01); *B01J 23/18* (2013.01); *B01J 27/0573* (2013.01); *B01J 27/0576* (2013.01); *C01B 3/58* (2013.01); *B01D 71/36* (2013.01); *B01D 71/38* (2013.01); *B01D 71/40* (2013.01); *B01D 2053/223* (2013.01); *B01D 2256/16* (2013.01); *B01D 2257/504* (2013.01); *B01D 2325/10* (2013.01); *B01D 2325/36* (2013.01); *B01D 2325/38* (2013.01); *C01B 2203/0405* (2013.01); *C01B 2203/0435* (2013.01); *C01B 2203/0475* (2013.01); *Y02C 10/10* (2013.01)

| Sample | Constitutional conditions of separation-functional membranes ||| Membrane performance |||
| --- | --- | --- | --- | --- | --- | --- |
| | $CO_2$ hydration reaction catalyst | $CO_2$ carrier | Molar ratio of $CO_2$ carrier to $CO_2$ hydration reaction catalyst | Hydrophilic polymer | $CO_2$ permeance (mol/($m^2 \cdot s \cdot kPa$)) | $H_2$ permeance (mol/($m^2 \cdot s \cdot kPa$)) | $CO_2/H_2$ selectivity |
| Example 1 | Potassium tellurite | Cesium carbonate | 1 : 0.025 | PVA/PAA salt copolymer | $4.33 \times 10^{-5}$ | $3.64 \times 10^{-7}$ | 119 |
| Example 2 | Lithium tellurite | Cesium carbonate | 1 : 0.025 | PVA/PAA salt copolymer | $4.98 \times 10^{-5}$ | $4.61 \times 10^{-7}$ | 108 |
| Example 3 | Potassium selenite | Cesium carbonate | 1 : 0.025 | PVA/PAA salt copolymer | $3.52 \times 10^{-5}$ | $2.61 \times 10^{-7}$ | 135 |
| Example 4 | Sodium arsenite | Cesium carbonate | 1 : 0.025 | PVA/PAA salt copolymer | $4.09 \times 10^{-5}$ | $3.94 \times 10^{-7}$ | 104 |
| Example 5 | Sodium orthosilicate | Cesium carbonate | 1 : 0.025 | PVA/PAA salt copolymer | $3.24 \times 10^{-5}$ | $2.95 \times 10^{-7}$ | 110 |
| Example 6 | Potassium tellurite | Rubidium carbonate | 1 : 0.05 | PVA/PAA salt copolymer | $4.78 \times 10^{-5}$ | $2.52 \times 10^{-7}$ | 190 |
| Example 7 | Potassium tellurite | Cesium carbonate | 1 : 0.2 | PVA/PAA salt copolymer | $5.49 \times 10^{-5}$ | $4.15 \times 10^{-7}$ | 132 |
| Comp. Ex. 1 | none | Cesium carbonate | — | PVA/PAA salt copolymer | $2.83 \times 10^{-5}$ | $3.58 \times 10^{-7}$ | 79.2 |
| Comp. Ex. 2 | none | Rubidium carbonate | — | PVA/PAA salt copolymer | $2.84 \times 10^{-5}$ | $3.05 \times 10^{-7}$ | 93.1 |

Fig. 3

| Sample | Constitutional conditions of separation-functional membranes | | | | Process Condition | Membrane performance | | |
|---|---|---|---|---|---|---|---|---|
| | $CO_2$ hydration reaction catalyst | $CO_2$ carrier | Molar ratio of $CO_2$ carrier to $CO_2$ hydration reaction catalyst | Hydrophilic polymer | Number of casting | $CO_2$ permeance (mol/($m^2 \cdot s \cdot kPa$)) | $H_2$ permeance (mol/($m^2 \cdot s \cdot kPa$)) | $CO_2/H_2$ selectivity |
| Example 2 | Lithium tellurite | Cesium carbonate | 1 : 0.025 | PVA/PAA salt copolymer | 1 | $4.98 \times 10^{-5}$ | $4.61 \times 10^{-7}$ | 108 |
| Example 8 | Lithium tellurite | Cesium carbonate | 1 : 0.025 | PVA/PAA salt copolymer | 2 | $4.72 \times 10^{-5}$ | $2.04 \times 10^{-7}$ | 231 |
| Example 9 | Potassium molybdate | Cesium carbonate | 1 : 0.1 | PVA/PAA salt copolymer | 2 | $3.28 \times 10^{-5}$ | $2.56 \times 10^{-7}$ | 128 |
| Example 10 | Potassium tellurite | Cesium carbonate | 1 : 0.2 | PVA | 2 | $3.63 \times 10^{-5}$ | $2.62 \times 10^{-7}$ | 138 |
| Comp. Ex. 1 | none | Cesium carbonate | — | PVA/PAA salt copolymer | 1 | $2.83 \times 10^{-5}$ | $3.58 \times 10^{-7}$ | 79.2 |
| Comp. Ex. 4 | none | Cesium carbonate | — | PVA/PAA salt copolymer | 2 | $2.77 \times 10^{-5}$ | $2.31 \times 10^{-7}$ | 120 |
| Comp. Ex. 5 | none | Cesium carbonate | — | PVA | 2 | $2.84 \times 10^{-5}$ | $3.05 \times 10^{-7}$ | 93.1 |

Fig. 7

FACILITATED CO₂ TRANSPORT MEMBRANE AND METHOD FOR PRODUCING SAME, AND METHOD AND APPARATUS FOR SEPARATING CO₂

CROSS-REFERENCE TO RELATED APPLICATIONS

This application is a National Phase filing under 35 U.S.C. §371 of International Application No. PCT/JP2013/076665 filed on Oct. 1, 2013, and which claims priority to Japanese Patent Application No. 2012-220250 filed on Oct. 2, 2012.

TECHNICAL FIELD

The present invention relates to a facilitated $CO_2$ transport membrane that is used for separating carbon dioxide ($CO_2$), particularly to a facilitated $CO_2$ transport membrane that separates carbon dioxide produced as a by-product in a hydrogen production process or the like at a high selection ratio to hydrogen. The present invention further relates to a method for producing the facilitated $CO_2$ transport membrane, and a method and an apparatus for separating $CO_2$ using the facilitated $CO_2$ transport membrane.

BACKGROUND ART

In a hydrogen production process, it is necessary that $CO_2$ produced as a by-product in the course of producing hydrogen be separated and removed from a hydrogen gas.

A chemical absorption method that is used in a decarbonation processes in existing large-scale plants such as hydrogen production plants and ammonia production plants requires a huge $CO_2$ absorption tower and a huge regeneration tower for a $CO_2$ absorbing liquid in order to separate $CO_2$, and in a regeneration step for the $CO_2$ absorbing liquid, requires a large amount of steam for heating the $CO_2$ absorbing liquid to remove $CO_2$ therefrom so that the liquid absorbing $CO_2$ can be reused, and therefore energy is wastefully consumed.

In recent years, as a countermeasure for global warming, natural energy that does not emit $CO_2$ has been expected to come into wide use, but natural energy has a significant problem in terms of cost. Thus, attention has been paid to a method called CCS (Carbon dioxide Capture and Storage) in which $CO_2$ is separated and collected from waste gases from thermal power plants, ironworks and the like, and buried in the ground or sea. Currently, even CCS is based on application of the chemical absorption method. In this case, for separating and collecting $CO_2$ from thermal power plants, not only large-scale $CO_2$ separation equipment is required, but also a large amount of steam should be fed.

On the other hand, a $CO_2$ separation and collection process using a membrane separation method is intended to separate a gas by means of a difference in velocity of gases passing through a membrane using a partial pressure difference as driving energy, and is expected as an energy-saving process because the pressure of a gas to be separated can be utilized as energy and no phase change is involved.

Gas separation membranes are broadly classified into organic membranes and inorganic membranes in terms of a difference in membrane material. The organic membrane has the advantage of being inexpensive and excellent in moldability as compared to the inorganic membrane. The organic membrane that is used for gas separation is generally a polymer membrane prepared by a phase inversion method, and the mechanism of separation is based on a solution-diffusion mechanism in which a gas is separated by means of a difference in solubility of the gas in the membrane material and diffusion rate of the gas in the membrane.

The solution-diffusion mechanism is based on the concept that a gas is first dissolved in the membrane surface of a polymer membrane, and the dissolved molecules diffuse between polymer chains in the polymer membrane. Where for a gas component A, the permeability coefficient is $P_A$, the solubility coefficient is $S_A$, and the diffusion coefficient is $D_A$, the relational expression: $P_A = S_A \times D_A$ holds. The ideal separation factor $\alpha_{A/B}$, is expressed as $\alpha_{A/B} = P_A/P_B$ by taking the ratio of permeability coefficients between components A and B, and therefore $\alpha_{A/B} = (S_A/S_B) \times (D_A/D_B)$ holds. Here, $S_A/S_B$ is referred to as solubility selectivity, and $D_A/D_B$ is referred to as diffusivity selectivity.

Since the diffusion coefficient increases as the molecular diameter decreases, and the contribution of diffusivity selectivity is generally greater than that of solubility selectivity in gas separation, it is difficult to allow selective passage of gases having a larger molecular diameter by suppressing passage of gases having a smaller molecular diameter among multi-component gases having different molecular diameters.

Therefore, it is extremely difficult to prepare a $CO_2$ selective permeable membrane that separates, particularly from a mixed gas containing $H_2$ and $CO_2$, $CO_2$ with high selectivity to $H_2$ having the smallest molecular diameter among gas molecules. It is still more difficult to prepare a $CO_2$ selective permeable membrane that is capable of being put to practical use in a decarbonation process in a hydrogen production plant or the like and that functions at a high temperature of 100° C. or higher.

Thus, studies are conducted on a permeable membrane called a facilitated transport membrane that allows selective permeation of a gas by a facilitated transport mechanism, in addition to a solution-diffusion mechanism, using a substance called a "carrier" which selectively and reversibly reacts with $CO_2$ (see, for example, Patent Document 1 below). The facilitated transport mechanism has a structure in which a membrane contains a carrier which selectively reacts with $CO_2$. In the facilitated transport membrane, $CO_2$ passes not only physically by the solution-diffusion mechanism but also as a reaction product with the carrier, so that the permeation rate is accelerated. On the other hand, gases such as $N_2$ and $H_2$, which do not react with the carrier, pass only by the solution-diffusion mechanism, and therefore the separation factor of $CO_2$ with respect to these gases is extremely high. Energy generated during the reaction of $CO_2$ with the carrier is utilized as energy for releasing $CO_2$ by the carrier, and therefore there is no need to supply energy from outside, so that an essentially energy-saving process is provided.

PRIOR ART DOCUMENT

Patent Document

Patent Document 1: International Publication No. WO 2009/093666

SUMMARY OF THE INVENTION

Problems to be Solved by the Invention

Patent Document 1 proposes a facilitated $CO_2$ transport membrane having a $CO_2$ permeance and a $CO_2/H_2$ selectivity feasible at a high temperature condition of 100° C. or higher by using as a carrier a specific alkali metal salt such as cesium carbonate or rubidium carbonate.

The facilitated CO₂ transport membrane has a higher CO₂ permeation rate as compared to a membrane based on a solution-diffusion mechanism, but the number of carrier molecules that react with CO₂ molecules becomes less sufficient as the partial pressure of CO₂ increases, and therefore improvement is required for accommodating the membrane to carrier saturation even at such a high CO₂ partial pressure.

Further, there are expectations for provision of a facilitated CO₂ transport membrane that is applicable at a high temperature of 100° C. or higher and has an improved CO₂ permeance and an improved CO₂/H₂ selectivity in a decarbonation step in a hydrogen production process or the like.

In view of the above-mentioned problems, it is an object of the present invention to stably supply a facilitated CO₂ transport membrane having an improved CO₂ permeance and an improved CO₂/H₂ selectivity.

Means for Solving the Problems

For achieving the above-mentioned object, the present invention provides a facilitated CO₂ transport membrane comprising a separation-functional membrane that includes a hydrophilic polymer gel membrane containing a CO₂ carrier and a CO₂ hydration catalyst. It is to be noted that the CO₂ hydration catalyst is a catalyst that increases the reaction rate of the CO₂ hydration reaction shown in the following (Chemical Formula 1). The symbol "⇔" in the reaction formulae shown herein indicates that the reaction is a reversible reaction.

  (Chemical Formula 1)

The reaction of CO₂ with the CO₂ carrier is expressed by the following (Chemical Formula 2) as an overall reaction formula. It is to be noted that the (Chemical Formula 2) is based on the assumption that the CO₂ carrier is a carbonate. The CO₂ hydration reaction, one of elementary reactions of the above-mentioned reaction, is an extremely slow reaction under a catalyst-free condition, and addition of a catalyst accelerates the elementary reaction, so that the reaction of CO₂ with the CO₂ carrier is accelerated, and as a result, improvement of the permeation rate of CO₂ is expected.

  (Chemical Formula 2)

Thus, since the facilitated CO₂ transport membrane having the above-mentioned features contains a CO₂ carrier and a CO₂ hydration catalyst in a separation-functional membrane, the reaction of CO₂ with the CO₂ carrier is accelerated, so that a facilitated CO₂ transport membrane having an improved CO₂ permeance and an improved CO₂/H₂ selectivity can be provided. Further, since the CO₂ hydration catalyst effectively functions even at a high CO₂ partial pressure, the CO₂ permeance and CO₂/H₂ selectivity at a high CO₂ partial pressure are each improved. Further, since the separation-functional membrane is composed of a gel membrane rather than a liquid membrane or the like, high selective permeability to hydrogen can be stably exhibited even under pressure.

Further, in the facilitated CO₂ transport membrane having the above-mentioned features, the CO₂ hydration catalyst preferably has catalytic activity at a temperature of 100° C. or higher. The reaction of CO₂ with the CO₂ carrier is thereby accelerated at a temperature of 100° C. or higher, so that a facilitated CO₂ transport membrane having an improved CO₂ permeance and an improved CO₂/H₂ selectivity can be provided under such a temperature condition.

Further, in the facilitated CO₂ transport membrane having the above-mentioned features, the CO₂ hydration catalyst preferably has a melting point of 200° C. or higher, and is preferably soluble in water.

Further, in the facilitated CO₂ transport membrane having the above-mentioned features, the CO₂ hydration catalyst preferably contains an oxo acid compound, particularly preferably an oxo acid compound of at least one element selected from group 6 elements, group 14 elements, group 15 elements and group 16 elements.

Further, in the facilitated CO₂ transport membrane having the above-mentioned features, the CO₂ hydration catalyst preferably contains at least one of a tellurous acid compound, a selenious acid compound, an arsenious acid compound, an orthosilicic acid compound and a molybdic acid compound.

Particularly, when the melting point of the CO₂ hydration catalyst is 200° C. or higher, the catalyst can exist in the separation-functional membrane while being thermally stable, so that performance of the facilitated CO₂ transport membrane can be maintained over a long period of time. Further, when the CO₂ hydration catalyst is soluble in water, a hydrophilic polymer gel membrane containing a CO₂ hydration catalyst can be easily and stably prepared. When a tellurous acid compound, a selenious acid compound, an arsenious acid compound, an orthosilicic acid compound or a molybdic acid compound is used as the CO₂ hydration catalyst, stable improvement of membrane performance can be expected because all of these compounds are water soluble and have a melting point of 200° C. or higher.

Further, in the facilitated CO₂ transport membrane having the above-mentioned features, the gel membrane is preferably a hydrogel, further preferably a polyvinyl alcohol-polyacrylic acid (PVA/PAA) salt copolymer gel membrane.

The hydrogel is a three-dimensional network structure formed by crosslinking a hydrophilic polymer, and has a nature of being swollen when absorbing water. Here, a person skilled in the art may call the polyvinyl alcohol-polyacrylic acid salt copolymer occasionally a polyvinyl alcohol-polyacrylic acid copolymer.

Even when the amount of water in the membrane is small, carbon dioxide is facilitatively transported, but its permeation rate is generally low, and therefore a large amount of water should be held in the membrane for achieving a high permeation rate. Further, when the gel membrane as a separation-functional membrane is composed of a hydrogel having a high water-holding capacity in the facilitated CO₂ transport membrane having the above-mentioned features, a maximum possible amount of water can be held in the membrane even at a high temperature that causes a reduction in the amount of water in the separation-functional membrane, so that high selective permeability of CO₂ to hydrogen can be achieved at a high temperature of 100° C. or higher.

Further, in the facilitated CO₂ transport membrane having the above-mentioned features, the CO₂ carrier preferably contains at least one of a carbonate of an alkali metal, a bicarbonate of an alkali metal and a hydroxide of an alkali metal, and further the alkali metal is preferably cesium or rubidium. High selective permeability of CO₂ to hydrogen can be thereby achieved more reliably at a high temperature of 100° C. or higher.

Here, a reaction expressed by the above (Chemical Formula 2) occurs when the CO₂ carrier is a carbonate of an alkali metal, while a reaction expressed by the following (Chemical Formula 3) occurs when the CO₂ carrier is a hydroxide of an alkali metal. The (Chemical Formula 3) shows a case where the alkali metal is cesium as an example.

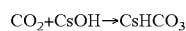

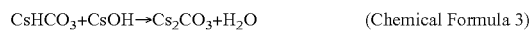  (Chemical Formula 3)

The reactions in the above (Chemical Formula 3) can be united into a reaction expressed by the (Chemical Formula 4). That is, this shows that added cesium hydroxide is converted into cesium carbonate. Further, it is apparent from the above (Chemical Formula 3) that a similar effect can be obtained when as a $CO_2$ carrier, a bicarbonate is added in place of a carbonate of an alkali metal.

$$CO_2 + 2CsOH \rightarrow Cs_2CO_3 + H_2O \qquad \text{(Chemical Formula 4)}$$

Further, in the facilitated $CO_2$ transport membrane having the above-mentioned features, the separation-functional membrane is preferably supported on a hydrophilic porous membrane.

First, when the separation-functional membrane is supported on a porous membrane, the strength of the facilitated $CO_2$ transport membrane at the time of use is improved. As a result, in the case where the facilitated $CO_2$ transport membrane is applied to a $CO_2$ permeable membrane reactor (shift converter including a facilitated $CO_2$ transport membrane), a sufficient membrane strength can be secured even when a pressure difference between both sides (inside and outside of a reactor) of the facilitated $CO_2$ transport membrane is large (e.g. 2 atm or larger).

Further, when the porous membrane supporting a separation-functional membrane as a gel membrane is hydrophilic, a gel membrane having reduced defects can be stably prepared, so that high selective permeability to hydrogen can be maintained. In general, when the porous membrane is hydrophobic, it is supposed that penetration of water contained in the gel membrane into the pores of the porous membrane and the resulting reduction of membrane performance can be prevented at 100° C. or lower, and a similar effect may be expected at 100° C. or higher where the amount of water in the gel membrane is small. Therefore, use of a hydrophobic porous membrane is recommended. However, in the case of the facilitated $CO_2$ transport membrane having the above-mentioned features, high selective permeability to hydrogen can be maintained with reduced defects by using a hydrophilic porous membrane for the following reason.

When a cast solution including an aqueous solution containing a hydrophilic polymer such as a PVA/PAA salt copolymer and a $CO_2$ carrier is cast on a hydrophilic porous membrane, pores of the porous membrane are filled with the solution, and a surface of the porous membrane is coated with the cast solution. When a separation-functional membrane is prepared by gelling the cast solution, not only a surface but also pores of the porous membrane are filled with the gel membrane, and therefore defects are hard to occur, leading to an increase in gel membrane production success rate.

When considering the ratio of pore portions (porosity) and the situation in which the pore does not extend straight perpendicularly to the membrane surface but bends many times (bending rate), the gel membrane in pores provides a great resistance to gas permeation, leading to a reduction in gas permeance due to low permeability as compared to the gel membrane on the surface of the porous membrane. On the other hand, when a cast solution is cast on a hydrophobic porous membrane, pores of the porous membrane are not filled with the solution but only a surface of the porous membrane is coated with the cast solution, so that pores are filled with a gas, and therefore gas permeance in the gel layer on the hydrophobic porous membrane is considered to be higher for both $H_2$ and $CO_2$ as compared to a hydrophilic porous membrane.

However, minute defects easily occur in the gel membrane on the membrane surface as compared to the gel membrane in pores, leading to a reduction in membrane production success rate. $H_2$ is much smaller in molecular size than $CO_2$, and therefore at a minute defect part, the permeance of $H_2$ is remarkably larger than that of $CO_2$. At a part other than the defect part, the permeance of $CO_2$ passing by the facilitated transport mechanism is considerably larger than the permeance of $H_2$ passing by the physical solution-diffusion mechanism.

As a result, when a hydrophobic porous membrane is used, selectivity to hydrogen ($CO_2/H_2$) is reduced as compared to when a hydrophilic porous membrane is used. Therefore, stability and durability of the facilitated $CO_2$ transport membrane are very important from the viewpoint of practical use, and it is more advantageous to use a hydrophilic porous membrane having high selectivity to hydrogen ($CO_2/H_2$).

Further, the separation-functional membrane supported on the hydrophilic porous membrane is preferably covered with a hydrophobic porous membrane. The separation-functional membrane is thereby protected by the hydrophobic porous membrane, leading to a further increase in strength of the facilitated $CO_2$ transport membrane at the time of use. The separation-functional membrane is covered with the hydrophobic porous membrane, and therefore even when steam is condensed on the membrane surface of the hydrophobic porous membrane, water is repelled and thereby prevented from penetrating the separation-functional membrane because the porous membrane is hydrophobic. Accordingly, the hydrophobic porous membrane can prevent a situation in which the $CO_2$ carrier in the separation-functional membrane is diluted with water, and the diluted $CO_2$ carrier flows out of the separation-functional membrane.

A cause which hinders downsizing and reduction of the startup time in conventional shift converters is that a large amount of a shift catalyst is required due to the restriction from chemical equilibrium of the CO shift reaction expressed by the following (Chemical Formula 5). As an example, a reforming system for a 50 kW PAFC (phosphoric acid fuel cell) requires 20 L of a reforming catalyst, whereas the shift catalyst is required in an amount of 77 L, about 4 times the amount of the reforming catalyst. This is a major factor of hindering downsizing and reduction of the startup time in the shift converter.

$$CO + H_2O \leftrightarrow CO_2 + H_2 \qquad \text{(Chemical Formula 5)}$$

Thus, when the facilitated $CO_2$ transport membrane having the above-mentioned features is applied to a $CO_2$ permeable membrane reactor, carbon dioxide on the right side, which is produced through the CO shift reaction of the above (Chemical Formula 5), is efficiently removed to outside the shift converter, so that chemical equilibrium can be shifted to the hydrogen production side (right side) to obtain a high conversion rate at the same reaction temperature, and resultantly carbon monoxide and carbon dioxide can be removed beyond the limit imposed by equilibrium restriction. As a result, downsizing, reduction of the startup time and velocity enhancement (SV enhancement) in the shift converter can be achieved.

Further, the present invention provides a method for producing the facilitated $CO_2$ transport membrane having the above-mentioned features, the method comprising the steps of: preparing a cast solution including an aqueous solution containing the hydrophilic polymer, the $CO_2$ carrier and the $CO_2$ hydration catalyst that is soluble in water; and casting the cast solution on a hydrophilic porous membrane and then gelling the cast solution to prepare the separation-functional membrane.

According to the method for producing the facilitated $CO_2$ transport membrane having the above-mentioned features, since a cast solution is prepared beforehand in which the relative amounts of the $CO_2$ carrier and the water-soluble $CO_2$ hydration catalyst to the hydrophilic polymer is properly adjusted, proper adjustment of the blending ratio of the $CO_2$ carrier and the $CO_2$ hydration catalyst in the final gel membrane can be easily and conveniently achieved, so that performance of the membrane can be enhanced.

Further, the present invention provides a method for separating $CO_2$ using the facilitated $CO_2$ transport membrane having the above-mentioned features, with the $CO_2$ hydration catalyst having catalytic activity at a temperature of 100° C. or higher, wherein a mixed gas containing $CO_2$ and $H_2$ and having a temperature of 100° C. or higher is supplied to the facilitated $CO_2$ transport membrane, and the $CO_2$ passing through the facilitated $CO_2$ transport membrane is separated from the mixed gas.

Further, the present invention provides a $CO_2$ separation apparatus comprising the facilitated $CO_2$ transport membrane having the above-mentioned features, with the $CO_2$ hydration catalyst having catalytic activity at a temperature of 100° C. or higher, wherein a mixed gas containing $CO_2$ and $H_2$ and having a temperature of 100° C. or higher is supplied to the facilitated $CO_2$ transport membrane, and the $CO_2$ passing through the facilitated $CO_2$ transport membrane is separated from the mixed gas.

EFFECTS OF THE INVENTION

According to the facilitated $CO_2$ transport membrane having the above-mentioned features and the method for producing the same, a facilitated $CO_2$ transport membrane having an improved $CO_2$ permeance and an improved $CO_2/H_2$ selectivity can be stably supplied. Particularly, the $CO_2$ hydration catalyst has catalytic activity at a temperature of 100° C. or higher, so that a facilitated $CO_2$ transport membrane that is applicable at a high temperature of 100° C. or higher and capable of achieving high selective permeability to hydrogen can be stably supplied in a decarbonation step in a hydrogen production process or the like.

Further, according to the $CO_2$ separation method and apparatus having the above-mentioned features, a facilitated $CO_2$ transport membrane having high selective permeability to hydrogen at a high temperature of 100° C. or higher is used, so that $CO_2$ can be selectively separated with high efficiency from a mixed gas containing $CO_2$ and $H_2$ and having a temperature of 100° C. or higher.

BRIEF DESCRIPTION OF THE DRAWINGS

FIG. 3 is a table showing a list of constitutional conditions and membrane performance for separation-functional membranes of Examples 1 to 7 and Comparative Examples 1 and 2 used in experiments for evaluation of membrane performance of a facilitated $CO_2$ transport membrane according to the present invention.

FIG. 7 is a table showing a list of constitutional conditions and membrane performance for separation-functional membranes of Examples 2, and 8 to 10 and Comparative Examples 1, 4 and 5 used in experiments for evaluation of membrane performance of a facilitated $CO_2$ transport membrane according to the present invention.

DESCRIPTION OF EMBODIMENTS

Figure 1:
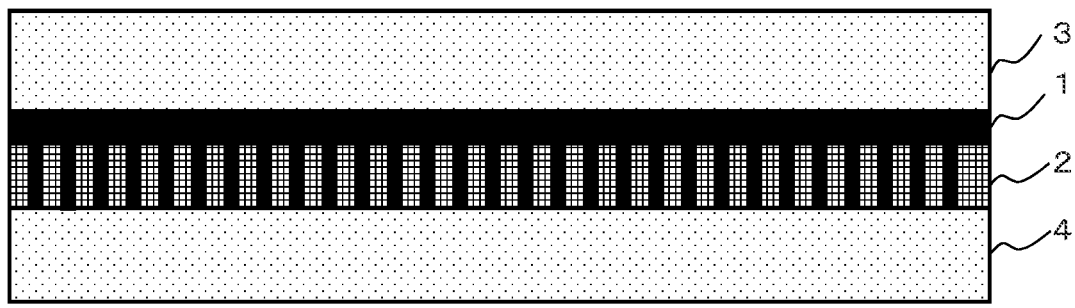
FIG. 1 is a sectional view schematically showing a structure in one embodiment of a facilitated $CO_2$ transport membrane according to the present invention.

By extensively conducting studies, the inventors of the present application have found that when a gel membrane of a facilitated $CO_2$ transport membrane, which contains a $CO_2$ carrier and in which a reaction of $CO_2$ with the $CO_2$ carrier as expressed by the above (Chemical Formula 2) occurs, contains a catalyst for a $CO_2$ hydration reaction as expressed by the above (Chemical Formula 1), one of elementary reactions of the above-mentioned reaction, the catalyst being capable of maintaining catalytic activity without being deactivated at a high temperature of 100° C. or higher, the $CO_2$ permeance is dramatically improved with respect to the $H_2$ permeance even at such a high temperature, and the $CO_2/H_2$ selectivity is considerably improved as compared to a conventional facilitated $CO_2$ transport membrane that does not contain the catalyst. Based on the above-mentioned new finding, the inventors of the present application have completed the invention of a facilitated $CO_2$ transport membrane and a method for producing the same, and a method and an apparatus for separating $CO_2$ as shown below.

[First Embodiment]

First, one embodiment of a facilitated $CO_2$ transport membrane and a method for producing the same according to the present invention (hereinafter, referred to as "the present facilitated transport membrane" and "the present production method" as appropriate) will be described with reference to the drawings.

The present facilitated transport membrane is a facilitated $CO_2$ transport membrane including a separation-functional membrane that includes a water-containing hydrophilic polymer gel membrane containing a CO carrier and a $CO_2$ hydration catalyst having catalytic activity at a temperature of 100° C. or higher, the facilitated $CO_2$ transport membrane serving at a temperature of 100° C. or higher and having a high CO permeance and a high $CO_2/H_2$ selectivity, and the facilitated $CO_2$ transport membrane being applicable to a $CO_2$ permeable membrane reactor or the like. Further, for stably achieving a high $CO_2/H_2$ selectivity, the present facilitated transport membrane includes a hydrophilic porous membrane as a support membrane that supports a gel membrane containing a $CO_2$ carrier and a $CO_2$ hydration catalyst.

Specifically, the present facilitated transport membrane includes a polyvinyl alcohol-polyacrylic acid (PVA/PAA) salt copolymer as a membrane material of the separation-functional membrane, a carbonate of an alkali metal such as cesium carbonate ($Cs_2CO_3$) or rubidium carbonate ($Rb_2CO_3$) as the $CO_2$ carrier, and an oxo acid compound as the $CO_2$ hydration catalyst. More specifically, for the $CO_2$ hydration catalyst, an oxo acid compound of at least one element selected from group 6 elements, group 14 elements, group 15 elements and group 16 elements is used, and particularly preferably a tellurous acid compound, a selenious acid compound, an arsenious acid compound, an orthosilicic acid compound or a molybdic acid compound is used. All of $CO_2$ hydration catalysts used in this embodiment are soluble in water, and extremely thermally stable with a melting point of 400° C. or higher, and have catalytic activity at a high temperature of 100° C. or higher. The melting point of the $CO_2$ hydration catalyst is only required to be higher than the upper limit of temperature variations in steps in a method for producing the present facilitated transport membrane as described later (e.g. the temperature in the drying step or thermal crosslinking temperature). When the melting point is, for example, about 200° C. or higher, a situation is avoided in which the $CO_2$ hydration catalyst is sublimed in the course of the production process, leading to a reduction in concentration of the $CO_2$ hydration catalyst in the separation-functional membrane.

As an example, the present facilitated transport membrane is configured as a three-layer structure in which a hydrophilic porous membrane 2 supporting a separation-functional membrane 1 is held between two hydrophobic porous membranes 3 and 4 as schematically shown in FIG. 1. The separation-functional membrane 1 as a gel membrane is supported on the hydrophilic porous membrane 2 and has a certain level of mechanical strength, and therefore is not necessarily required to be held between the two hydrophobic porous membranes 3 and 4. The mechanical strength can also be increased by, for example, forming the hydrophilic porous membrane 2 in a cylindrical shape. Therefore, the present facilitated transport membrane is not necessarily a flat plate-shaped one.

The separation-functional membrane contains the PVA/PAA salt copolymer in an amount falling within a range of about 10 to 80% by weight, and the $CO_2$ carrier in an amount falling within a range of about 20 to 90% by weight based on the total weight of the PVA/PAA salt copolymer and the $CO_2$ carrier in the separation-functional membrane.

Further, the separation-functional membrane contains the $CO_2$ hydration catalyst, for example, in an amount of 0.01 times or more, preferably 0.02 times or more, further preferably 0.025 times or more the amount of the $CO_2$ carrier in terms of molar number.

The hydrophilic porous membrane preferably has heat resistance to a temperature of 100° C. or higher, mechanical strength and adhesion with the separation-functional membrane (gel membrane) in addition to hydrophilicity, and preferably has a porosity (void ratio) of 55% or more and a pore size falling within a range of 0.1 to 1 μm. In this embodiment, a hydrophilized tetrafluoroethylene polymer (PTFE) porous membrane is used as a hydrophilic porous membrane that satisfies the above-mentioned requirements.

The hydrophobic porous membrane preferably has heat resistance to a temperature of 100° C. or higher, mechanical strength and adhesion with the separation-functional membrane (gel membrane) in addition to hydrophobicity, and preferably has a porosity (void ratio) of 55% or more and a pore size falling within a range of 0.1 to 1 μm. In this embodiment, a non-hydrophilized tetrafluoroethylene polymer (PTFE) porous membrane is used as a hydrophobic porous membrane that satisfies the above-mentioned requirements.

Figure 2:
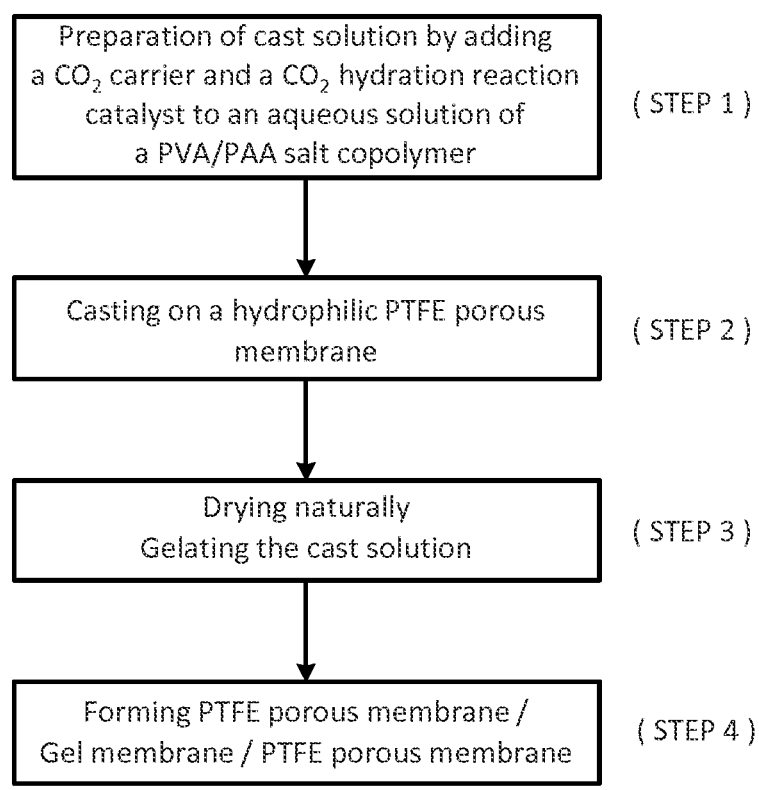
FIG. 2 is a flow chart showing a method for producing a facilitated $CO_2$ transport membrane according to the present invention.

One embodiment of a method for producing the present facilitated transport membrane (the present production method) will now be described with reference to FIG. 2. The following descriptions are based on the assumption that a PVA/PAA salt copolymer is used as the hydrophilic polymer, cesium carbonate ($Cs_2CO_3$) is used as the $CO_2$ carrier, and a tellurite (e.g. potassium tellurite ($K_2TeO_3$)) is used as the $CO_2$ hydration catalyst. The amounts of the hydrophilic polymer, the $CO_2$ carrier and the $CO_2$ hydration catalyst are illustrative, and show amounts used in sample preparation in examples described below.

First, a cast solution including an aqueous solution containing a PVA/PAA salt copolymer, a $CO_2$ carrier and a $CO_2$ hydration catalyst is prepared (step 1). More specifically, 2 g of a PVA/PAA salt copolymer (e.g. provisional name: SS Gel manufactured by Sumitomo Seika Chemicals Company Limited), 4.67 g of cesium carbonate, and a tellurite in an amount of 0.025 times the amount of cesium carbonate in terms of molar number are added to 80 g of water, and the resultant mixture is stirred until they are dissolved, thereby obtaining a cast solution.

Next, the cast solution obtained in step 1 is cast on a hydrophilic PTFE porous membrane side surface of a layered porous membrane by an applicator (step 2), the layered porous membrane being obtained by joining two membranes: a hydrophilic PTFE porous membrane (e.g. WPW-020-80 manufactured by SUMITOMO ELECTRIC FINE POLYMER, INC.; thickness: 80 μm; pore size: 0.2 μm; void ratio: about 75%) and a hydrophobic PTFE porous membrane (e.g. FLUOROPORE FP010 manufactured by SUMITOMO ELECTRIC FINE POLYMER, INC.; thickness: 60 μm; pore size: 0.1 μm; void ratio: 55%). The casting thickness in samples of examples and comparative examples described later is 500 μm. Here, the cast solution penetrates pores in the hydrophilic PTFE porous membrane, but is inhibited from penetrating at the boundary surface of the hydrophobic PTFE porous membrane, so that the cast solution does not permeate to the opposite surface of the layered porous membrane, and there is no cast solution on a hydrophobic PTFE porous membrane side surface of the layered porous membrane. This makes handling easy.

Next, the hydrophilic PTFE porous membrane after casting is naturally dried at room temperature, and the cast solution is then gelled to produce a separation-functional membrane (step 3). Here, gelation means that the cast solution as a polymer dispersion liquid is dried into a solid form, and the gel membrane is a solid membrane produced by the gelation, and is clearly distinguished from a liquid membrane.

In the present production method, the cast solution is cast on a hydrophilic PTFE porous membrane side surface of the layered porous membrane in step 2, and therefore the separation-functional membrane is not only formed on a surface (cast surface) of the hydrophilic PTFE porous membrane but also formed so as to fill pores in step 3, so that defects (minute defects such as pinholes) are hard to occur, leading to an increase in membrane production success rate of the separation-functional membrane. It is desirable to further thermally crosslink the naturally dried PTFE porous membrane at about 120° C. for about 2 hours in step 3. All of samples in examples and comparative examples described later are thermally crosslinked.

Next, a hydrophobic PTFE porous membrane identical to the hydrophobic PTFE porous membrane of the layered porous membrane used in step 2 is superimposed on a gel layer side surface of the hydrophilic PTFE porous membrane obtained in step 3 to obtain the present facilitated transport membrane of three layer structure including a hydrophobic PTFE porous membrane/a separation-functional membrane supported on a hydrophilic PTFE porous membrane/a hydrophobic PTFE porous membrane as schematically shown in FIG. 1 (step 4). FIG. 1 schematically and linearly shows a state in which the separation-functional membrane 1 fills pores of the hydrophilic PTFE porous membrane 2.

In the present production method, the blending ratio of the $CO_2$ carrier and the $CO_2$ hydration catalyst can be adjusted in step 1 of producing a cast solution, and therefore, as compared to a case where after formation of a gel membrane that does not contain at least one of the $CO_2$ carrier and the $CO_2$ hydration catalyst, at least one of the $CO_2$ carrier and the $CO_2$ hydration catalyst is added into the gel membrane, adjustment of the blending ratio can be more accurately and easily performed, leading to enhancement of membrane performance.

Thus, the present facilitated transport membrane prepared by following steps 1 to 4 can exhibit extremely high selective permeability to hydrogen even at a high temperature of 100° C. or higher, for example a $CO_2$ permeance of about $3 \times 10^{-5}$ mol/(m²·s·kPa) (=90 GPU) or more and a $CO_2/H_2$ selectivity of about 100 or more.

Hereinafter, specific membrane performance of the present facilitated transport membrane is evaluated by comparing Examples 1 to 7 in which the separation-functional membrane contains a $CO_2$ hydration catalyst with Comparative Examples 1 and 2 in which the separation-functional membrane does not contain a $CO_2$ hydration catalyst.

The samples in Examples 1 to 7 and Comparative Examples 1 and 2 below were prepared in accordance with the present production method described above. The weights of the solvent (water), the hydrophilic polymer and the $CO_2$ carrier in the cast solution prepared in step 1 are the same among Examples 1 to 7 and Comparative Examples 1 and 2. As the hydrophilic polymer, a PVA/PAA salt copolymer was used. As the $CO_2$ carrier, cesium carbonate ($Cs_2CO_3$) is used except for Example 6, and the weight ratio of cesium carbonate to the total weight of the PVA/PAA salt copolymer and cesium carbonate (carrier concentration) is 70% by weight in each of the examples and comparative examples. In Example 6, rubidium carbonate ($Rb_2CO_3$) is used as the $CO_2$ carrier, and the weight ratio of rubidium carbonate to the total weight of the PVA/PAA salt copolymer (2 g) identical to that in Example 1 and rubidium carbonate (4.67 g) (carrier concentration) is 70% by weight.

In Examples 1, 6 and 7, potassium tellurite (melting point: 465° C.) was used as the $CO_2$ hydration catalyst. In Examples 2 to 5, lithium tellurite ($Li_2O_3Te$, melting point: about 750° C.), potassium selenite ($K_2O_3Se$, melting point: 875° C.), sodium arsenite ($NaO_2As$, melting point: 615° C.) and sodium orthosilicate ($Na_4O_4Si$, melting point: 1018° C.) were used, respectively, as the $CO_2$ hydration catalyst. The molar ratio of the $CO_2$ hydration catalyst to the $CO_2$ carrier is 0.025 in Examples 1 to 5, 0.05 in Example 6, and 0.2 in Example 7.

The sample in Comparative Example 1 was prepared in the same manner as in Example 1 except that the cast solution prepared in step 1 in the production method described above did not contain a $CO_2$ hydration catalyst. The sample in Comparative Example 2 was prepared in the same manner as in Example 6 except that the cast solution prepared in step 1 in the production method described above did not contain a $CO_2$ hydration catalyst.

An experiment method for evaluating membrane performance of the samples in Examples 1 to 7 and Comparative Examples 1 and 2 will now be described.

Each sample was used while being fixed between a supply side chamber and a permeate side chamber in a stainless steel flow type gas permeation cell using a fluororubber gasket as a seal material. Experimental conditions are the same for the samples, and the temperature of the inside of the cell is fixed at 130° C.

The supply side gas supplied to the supply side chamber is a mixed gas including $CO_2$, $H_2$ and $H_2O$ (steam), and the ratio (mol %) among them is $CO_2:H_2:H_2O$=23.6:35.4:41.0. The flow rate of the supply side gas is $3.47 \times 10^{-2}$ mol/min. and the supply side pressure is 600 kPa (A). (A) means an absolute pressure. Accordingly, the $CO_2$ partial pressure on the supply side is 142 kPa (A). The pressure of the supply side chamber is adjusted with a back pressure regulator provided on the downstream side of a cooling trap at some midpoint in an exhaust gas discharging passage.

On the other hand, the pressure of the permeate side chamber is atmospheric pressure. $H_2O$ (steam) is used as a sweep gas made to flow into the permeate side chamber, and the flow rate thereof is $7.77 \times 10^{-3}$ mol/min. For sending the sweep gas discharged from the permeate side chamber to a gas chromatograph on the downstream side, an Ar gas is inpoured, steam in the gas containing the Ar gas is removed by the cooling trap, the composition of the gas after passing through the cooling trap is quantitatively determined by the gas chromatograph, the permeance [mol/(m²·s·kPa)] of each of $CO_2$ and $H_2$ is calculated from the composition and the flow rate of Ar in the gas, and from the ratio thereof, the $CO_2/H_2$ selectivity is calculated.

In the evaluation experiment described above, the experiment apparatus has a pre-heater for heating the gas and the flow type gas permeation cell with a sample membrane fixed therein is placed in a thermostatic oven in order to keep constant the use temperature of the present facilitated transport membrane of each sample and the temperatures of the supply side gas and the sweep gas.

Next, comparison of membrane performance obtained in experiment results in Examples 1 to 7 and Comparative Examples 1 and 2 is made. FIG. 3 shows a list of constitutional conditions ($CO_2$ carrier, $CO_2$ hydration catalyst, molar ratio of $CO_2$ carrier to $CO_2$ hydration catalyst, hydrophilic polymer) and membrane performance ($CO_2$ permeance, $H_2$ permeance and $CO_2/H_2$ selectivity) for separation-functional membranes of the samples in Examples 1 to 7 and Comparative Examples 1 and 2.

Figure 4:
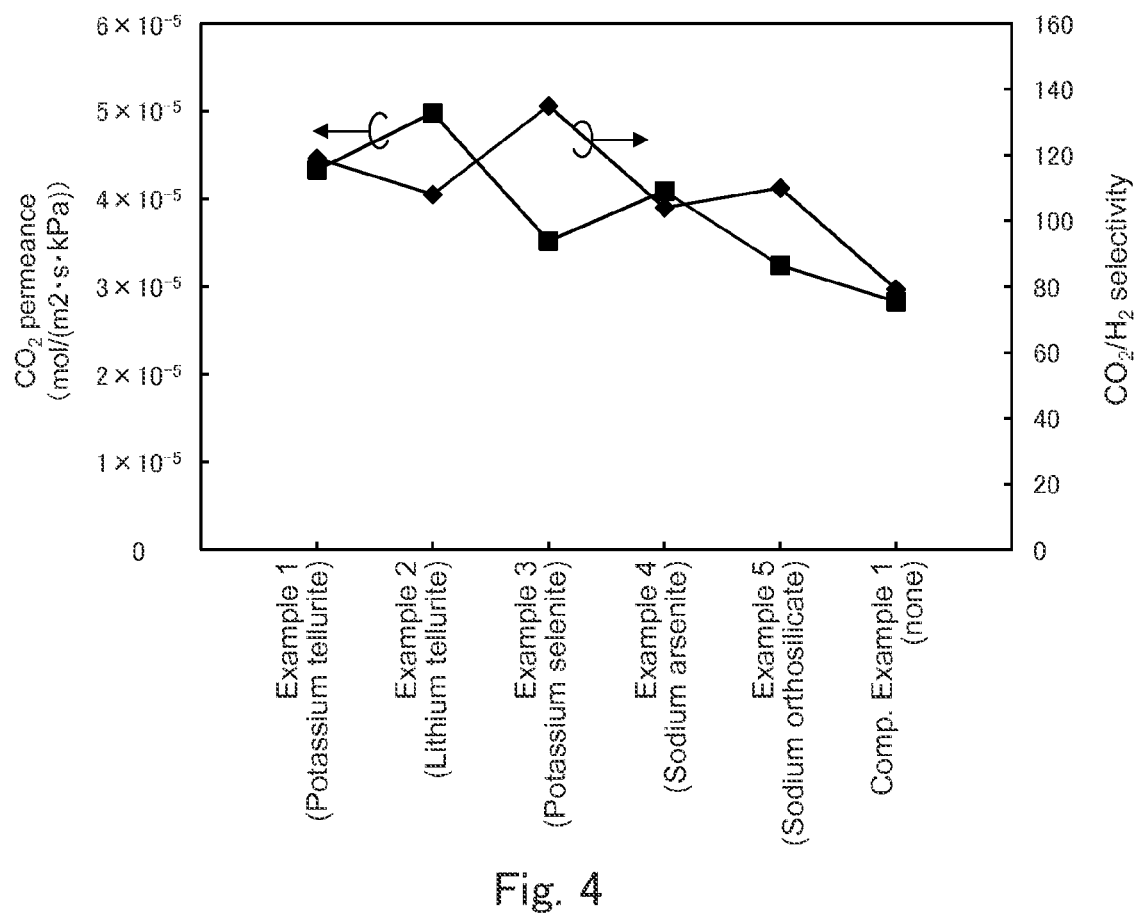
FIG. 4 is a graph showing a $CO_2$ permeance and a $CO_2/H_2$ selectivity in Examples 1 to 5 and Comparative Example 1 shown in FIG. 3.

First, comparison of membrane performance is made among Examples 1 to 5 and Comparative Example 1. Here, comparison of membrane performance associated with presence/absence of the $CO_2$ hydration catalyst and the type thereof is made. FIG. 4 shows, in the form of a graph, the $CO_2$ permeance and $CO_2/H_2$ selectivity in Examples 1 to 5 and Comparative Example 1. It is apparent from FIGS. 3 and 4 that since the separation-functional membrane contains a $CO_2$ hydration catalyst, the $CO_2$ permeance increases by a factor of 1.14 to 1.76, while the $H_2$ permeance increases by a factor of 0.72 to 1.29, and the increasing rate of $CO_2$ permeance is greater than that of $H_2$ permeance, so that the $CO_2/H_2$ selectivity is improved to fall within a range of 104 to 135 as compared to a $CO_2/H_2$ selectivity of 79.2 in Comparative Example 1.

While from FIG. 4, all of the $CO_2$ hydration catalysts are confirmed to improve both the $CO_2$ permeance and $CO_2/H_2$ selectivity, the $CO_2$ permeance is remarkably improved when a tellurite is used.

Since the $CO_2$ hydration catalyst is a catalyst for increasing the reaction rate of a $CO_2$ hydration reaction expressed by the above (Chemical Formula 1), it is considered that when the separation-functional membrane contains a $CO_2$ hydration catalyst, a reaction of $CO_2$ with a $CO_2$ carrier, which includes the $CO_2$ hydration reaction as one of elementary reactions and which is expressed by the above (Chemical Formula 2), is accelerated, leading to an increase in $CO_2$ permeance by the facilitated transport mechanism. This is consistent with the experiment results shown in FIG. 3. However, since $H_2$ does not react with the $CO_2$ carrier as described above, the $H_2$ permeation mechanism may be based on the solution-diffusion mechanism rather than the facilitated transport mechanism, and it is considered that the $H_2$ permeance is not directly affected by presence/absence of the $CO_2$ hydration catalyst, the blending ratio and type thereof, and the like. Further, the samples in Examples 1 to 7 and Comparative Examples 1 and 2 are different in constitutional conditions for the separation-functional membrane, and are therefore each individually prepared. Therefore, differences in measurement value of $H_2$ permeance among the samples are considered to mainly result from individual differences (variations) in membrane quality of the hydrophilic polymer gel membrane. It is to be noted that the $H_2$ permeance may be indirectly affected by influences on membrane quality of the hydrophilic polymer gel membrane given by differences in amount, type and the like of the $CO_2$ carrier and the $CO_2$ hydration catalyst in addition to the individual differences in membrane quality.

Figure 5:
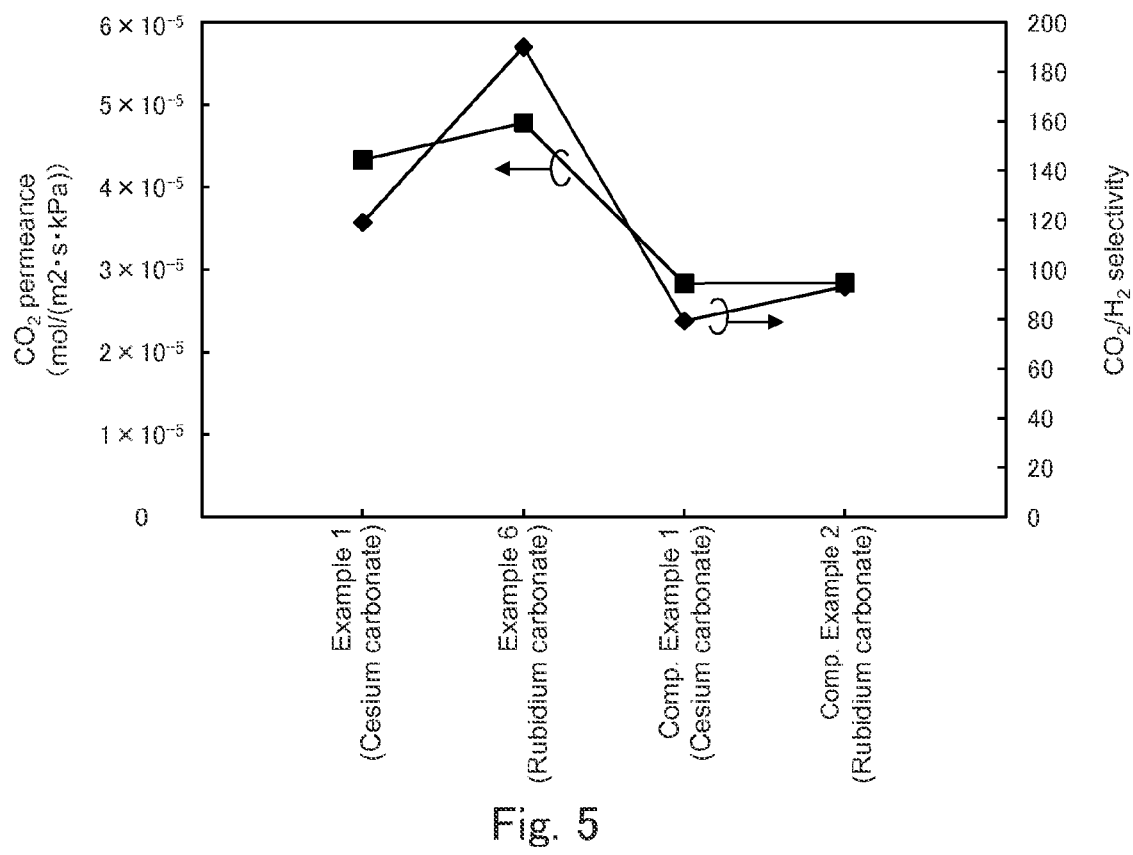
FIG. 5 is a graph showing a $CO_2$ permeance and a $CO_2/H_2$ selectivity in Examples 1 and 6 and Comparative Examples 1 and 2 shown in FIG. 3.

Next, comparison of membrane performance is made among Examples 1 and 6 and Comparative Examples 1 and 2. Here, comparison of membrane performance associated with presence/absence of the $CO_2$ hydration catalyst and the type the $CO_2$ carrier is made. FIG. 5 shows, in the form of a graph, the $CO_2$ permeance and $CO_2/H_2$ selectivity in Examples 1 and 6 and Comparative Examples 1 and 2. FIG. 5 shows that when the separation-functional membrane does not contain a $CO_2$ hydration catalyst, there is no significant difference in performance due to a difference in $CO_2$ carrier with the separation-functional membrane having a $CO_2$ permeance of 2.83 to 2.84×10$^{-5}$ (mol/(m$^2$·s·kPa)), a $H_2$ permeance of 3.05 to 3.58×10$^{-7}$ (mol/(m$^2$·s·kPa)) and a $CO_2/H_2$ selectivity of 79.2 to 93.1 in both cases where the $CO_2$ carrier is cesium carbonate and where the $CO_2$ carrier is rubidium carbonate. When the $CO_2$ carrier is cesium carbonate, performance is greatly improved with the $CO_2$ permeance increasing by a factor of 1.53, the $H_2$ permeance increasing by a factor of 1.02 and the $CO_2/H_2$ selectivity increasing by a factor of 1.50 because the separation-functional membrane contains a $CO_2$ hydration catalyst. When the $CO_2$ carrier is rubidium carbonate, performance is greatly improved as in the case where the $CO_2$ carrier is cesium carbonate, with the $CO_2$ permeance increasing by a factor of 1.68, the $H_2$ permeance increasing by a factor of 0.83 and the $CO_2/H_2$ selectivity increasing by a factor of 2.04. The reason why in Example 6, the $H_2$ permeance decreases to 0.83 times that in Comparative Example 2 may be because of individual differences in membrane quality of the hydrophilic polymer gel membrane.

Figure 6:
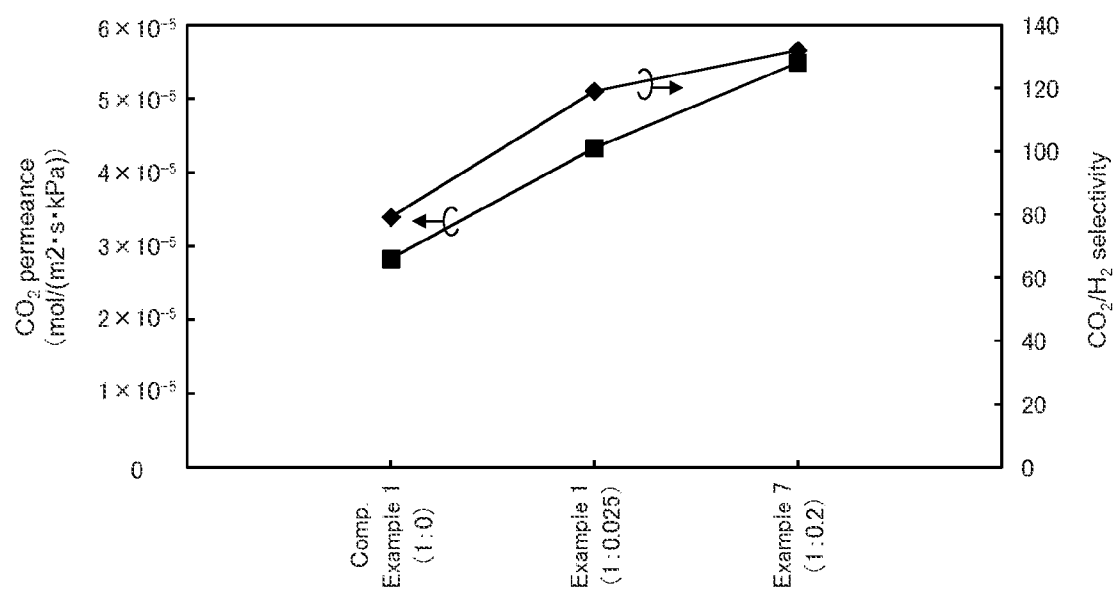
FIG. 6 is a graph showing a $CO_2$ permeance and a $CO_2/H_2$ selectivity in Examples 1 and 7 and Comparative Example 1 shown in FIG. 3.

Next, comparison of membrane performance is made among Examples 1 and 7 and Comparative Example 1. Here, comparison of membrane performance associated with presence/absence of the $CO_2$ hydration catalyst, and the blending ratio thereof (molar ratio to cesium carbonate) is made. FIG. 6 shows, in the form of a graph, the $CO_2$ permeance and $CO_2/H$, selectivity in Examples 1 and 7 and Comparative Example 1.

When comparison is made among Comparative Example 1 and Examples 1 and 7, it is apparent that both the $CO_2$ permeance and $CO_2/H_2$ selectivity are improved as the blending ratio of the $CO_2$ hydration catalyst (potassium tellurite) increases.

As a result of measuring the $CO_2$ permeance with another sample in which the molar ratio of the $CO_2$ hydration catalyst to the $CO_2$ carrier is decreased to 0.01 when the hydrophilic polymer is a PVA/PAA salt copolymer, the $CO_2$ carrier is cesium carbonate and the $CO_2$ hydration catalyst is potassium tellurite, aside from Examples 1 and 7, it has been confirmed that the $CO_2$ permeance was improved to 3.74×10$^{-5}$ (mol/(m$^2$·s·kPa)). i.e. 1.32 times the $CO_2$ permeance in Comparative Example 1.

While all of the separation-functional membranes in Examples 1 to 7 and Comparative Examples 1 and 2 are gel membranes, Comparative Example 3 having a liquid membrane (aqueous solution) as a separation-functional membrane was prepared as another comparative example. The aqueous solution of a separation-functional membrane in Comparative Example 3 does not contain the PVA/PAA salt copolymer used in Examples 1 to 7 and Comparative Example 1. In Comparative Example 3, cesium carbonate was used as a $CO_2$ carrier and potassium tellurite was used as a $CO_2$ hydration catalyst similarly to Example 1. Hereinafter, a method for preparing Comparative Example 3 will be described.

To an aqueous cesium carbonate solution having a molar concentration of 2 mol/L was added potassium tellurite in an amount of 0.025 times the amount of cesium carbonate in terms of molar number, and the resultant mixture was stirred until potassium tellurite was dissolved, thereby obtaining an aqueous solution for a separation-functional membrane (liquid membrane). Thereafter, instead of the casting method using an applicator in step 2 in the present production method, a hydrophilic PTFE porous membrane was immersed in the aqueous solution for a separation-functional membrane (liquid membrane) for 30 minutes, and the hydrophilic PTFE membrane soaked with the aqueous solution was then placed on a hydrophobic PTFE membrane, and dried at room temperature for half a day or longer. Similarly to Examples 1 to 7 and Comparative Examples 1 and 2, another hydrophobic PTFE membrane is placed on the hydrophilic PTFE membrane to form a three-layer structure with the hydrophilic PTFE porous membrane and the separation-functional membrane (liquid membrane) held between the hydrophobic PTFE membranes at the time of an experiment for evaluation of membrane performance.

However, in the case of the liquid membrane sample of Comparative Example 3, it was impossible to set the supply side pressure of 600 kPa (A), i.e. an experimental condition similar to that in Examples 1 to 7 and Comparative Examples 1 and 2, and membrane performance could not be evaluated. That is, it became evident that a necessary differential pressure cannot be maintained because the difference in pressure between the supply side and the permeate side in the separation-functional membrane (liquid membrane) cannot be endured.

Thus, by comparing membrane performance between Examples 1 to 7 in which the separation-functional membrane contains a $CO_2$ hydration catalyst and Comparative Examples 1 and 2 in which the separation-functional membrane does not contain a $CO_2$ hydration catalyst, an effect of considerably improving the $CO_2$ permeance and $CO_2/H_2$ selectivity was confirmed as the present facilitated transport membrane includes a $CO_2$ hydration catalyst in the separation-functional membrane. Here, the facilitated $CO_2$ transport membrane has such characteristics that in a certain thickness range, thickness dependency is kept low, so that the permeation rate of $CO_2$ hardly decreases even when the thickness increases. On the other hand, $H_2$ passes through the separation-functional membrane by the solution-diffusion mechanism as described above, and therefore its permeation rate tends to be inversely proportional to the membrane thickness. Therefore, further improvement of the $CO_2/H_2$ selectivity is expected due to the synergistic effect of the advantage that the effect of improving the $CO_2$ permeance due to presence of a $CO_2$ hydration catalyst in the separation-functional membrane is attained without depending on the membrane thickness and the advantage that the $H_2$ permeance is reduced as the thickness is increased.

Results of evaluating membrane performance in Examples 8 and 9 in which the separation-functional membrane prepared with a thickness that is about 2 times the thickness in Examples 1 to 7 and Comparative Examples 1 and 2 contains a $CO_2$ hydration catalyst and Comparative Example 4 in which the separation-functional membrane does not contain a $CO_2$ hydration catalyst will now be described.

The samples in Examples 8 and 9 and Comparative Example 4 were prepared in accordance with the present production method described above. It is to be noted that a series of steps including step 2 and step 3 were repeated twice for increasing the thickness of the separation-functional membrane. The weights of the solvent (water), the hydrophilic polymer and the $CO_2$ carrier in the cast solution prepared in step 1 are the same among Examples 8 and 9 and Comparative Example 4, and identical to those in Examples 1 to 7 and Comparative Examples 1 and 2. In each of Examples 8 and 9 and Comparative Example 4, cesium carbonate ($Cs_2CO_3$) is used as the $CO_2$ carrier, and the weight ratio of cesium carbonate to the total weight of the PVA/PAA salt copolymer and cesium carbonate (carrier concentration) is 70% by weight.

In Examples 8 and 9, lithium tellurite and potassium molybdate ($K_2O_4Mo$, melting point: about 919° C.) were used in this order as the $CO_2$ hydration catalyst. The molar ratio of the $CO_2$ hydration catalyst to the $CO_2$ carrier is 0.025 in Example 8, and 0.1 in Example 9. The sample in Comparative Example 4 was prepared in the same manner as in Example 8 except that the cast solution prepared in step 1 in the production method described above did not contain a $CO_2$ hydration catalyst.

An experiment method for evaluating membrane performance of the samples in Examples 8 and 9 and Comparative Example 4 is identical to the experiment method for evaluating membrane performance of the samples in Examples 1 to 7 and Comparative Examples 1 and 2 described above including the gas composition and ratio of the supply side gas, the gas flow rate, the pressure, the use temperature and so on.

Figure 8:
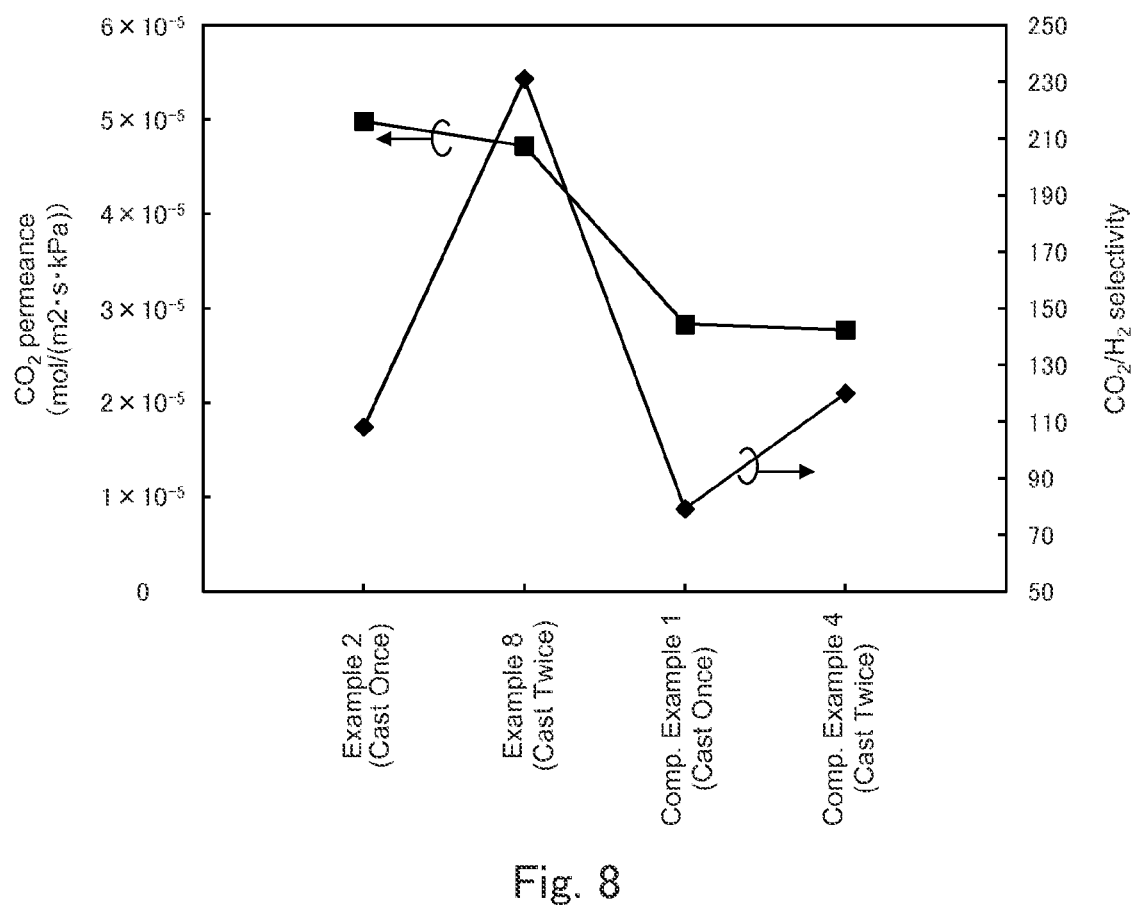
FIG. 8 is a graph showing a $CO_2$ permeance and a $CO_2/H_2$ selectivity in Examples 2 and 8 and Comparative Examples 1 and 4 shown in FIG. 7.

FIG. 7 shows a list of constitutional conditions ($CO_2$ carrier, $CO_2$ hydration catalyst, molar ratio of $CO_2$ carrier to $CO_2$ hydration catalyst, hydrophilic polymer) and membrane performance ($CO_2$ permeance, $H_2$ permeance and $CO_2/H_2$ selectivity) for separation-functional membranes of the samples in Examples 2, 8 and 9 and Comparative Examples 1 and 4. FIG. 8 shows, in the form of a graph, the $CO_2$ permeance and $CO_2/H_2$ selectivity in Examples 2 and 8 and Comparative Examples 1 and 4.

First, when comparison of membrane performance is made between Comparative Example 4 and Comparative Example 1, the membrane thickness in Comparative Example 4 is about 2 times the membrane thickness in Comparative Example 1, but there is no difference in other constitutional conditions of the separation-functional membrane, and therefore there is substantially no difference in $CO_2$ permeance as it is not significantly influenced by the membrane thickness, whereas the $H_2$ permeance is much lower in Comparative Example 4 than in Comparative Example 1 due to the about 2-fold difference in membrane thickness. As a result, the $CO_2/H_2$ selectivity is higher in Comparative Example 4 than in Comparative Example 1. Similarly, when comparison of membrane performance is made between Example 8 and Example 2, the membrane thickness in Example 8 is about 2 times the membrane thickness in Example 2, but there is no difference in other constitutional conditions of the separation-functional membrane, and therefore there is substantially no difference in $CO_2$ permeance as it is not significantly influenced by the membrane thickness, and an effect of improving the $CO_2$ permeance by the $CO_2$ hydration catalyst is similarly attained, whereas the $H_2$ permeance is much lower in Example 8 than in Example 2 due to the about 2-fold difference in membrane thickness. As a result, the $CO_2/H_2$ selectivity is higher in Example 8 than in Example 2. When comparison of membrane performance is made between Example 8 and Comparative Example 4, it is apparent that similarly to considerable improvement of the $CO_2$ permeance and $CO_2/H_2$ selectivity in Example 2 as compared to Comparative Example 1, the $CO_2$ permeance and $CO_2/H_2$ selectivity are considerably improved even when the thickness of the separation-functional membrane is large. That is, it has become evident that the effect of improving the $CO_2$ permeance due to presence of a $CO_2$ hydration catalyst in the separation-functional membrane is attained without depending on the thickness of the separation-functional membrane in a certain thickness range.

Next, when comparison is made between Example 9 and Comparative Example 4, an effect of improving the $CO_2$ permeance and $CO_2/H_2$ selectivity due to presence of a $CO_2$ hydration catalyst in the separation-functional membrane can be confirmed even with a membrane thickness that is about 2 times the membrane thickness in Examples 1 to 7 also when the $CO_2$ hydration catalyst is potassium molybdate.

Here, the $CO_2$ hydration catalyst in each of Examples 1 to 3 and 6 to 8 and Example 10 described later is an oxo acid compound of a group 16 element, the $CO_2$ hydration catalyst in Example 4 is an oxo acid compound of a group 15 element, the $CO_2$ hydration catalyst in Example 5 is an oxo acid compound of a group 14 element, and the $CO_2$ hydration catalyst in Example 9 is an oxo acid compound of a group 6 element. Accordingly, from the results of evaluating membrane performance, it is apparent that at least oxo acid compounds of group 6 elements, group 14 elements, group 15 elements and group 16 elements suitably include a $CO_2$ hydration catalyst which is soluble in water and extremely thermally stable with a melting point of 200° C. or higher, and has catalytic activity at a high temperature of 100° C. or higher. However, this does not mean that all the oxo acid compounds of group 6 elements, group 14 elements, group 15 elements and group 16 elements have catalytic activity as a $CO_2$ hydration catalyst, and the possibility is not ruled out that oxo acid compounds other than those of group 6 elements, group 14 elements, group 15 elements and group 16 elements include those which have catalytic activity as a $CO_2$ hydration catalyst and can be used for the present facilitated transport membrane.

Further, as substances having catalytic activity as a $CO_2$ hydration catalyst, there are many substances other than oxo acid compounds, such as enzymes. Therefore, the $CO_2$ hydration catalyst is not limited to the oxo acid compounds used in Examples 1 to 9 as long as it can be suitably used for the present facilitated transport membrane. Here, as an example of conditions suitable for the present facilitated transport membrane as a $CO_2$ hydration catalyst, the substance is soluble in water, and extremely thermally stable with a melting point of 200° C. or higher, and has catalytic activity at a high temperature of 100° C. or higher.

In the above-mentioned embodiment, as an example of a suitable configuration of the present facilitated transport membrane, a configuration has been shown in which a hydrogel of a PVA/PAA salt copolymer as a hydrophilic polymer is used as a membrane material of a separation-functional membrane, and a hydrophilic porous membrane is used as a porous membrane that supports the separation-functional membrane. However, since the hydrophilic polymer gel membrane contains a $CO_2$ hydration catalyst, the effect of improving the $CO_2$ permeance and $CO_2/H_2$ selectivity can also be exhibited, although varying in level, when a hydrophilic polymer other than PVA/PAA salt copolymers, such as, for example, polyvinyl alcohol (PVA) or a polyacrylic acid (PAA) salt is used, or when a hydrophobic porous membrane is used as a porous membrane that supports the separation-functional membrane.

Results of evaluating membrane performance in Example 10 in which the separation-functional membrane contains a $CO_2$ hydration catalyst and Comparative Example 5 in which the separation-functional membrane does not contain a $CO_2$ hydration catalyst, with polyvinyl alcohol (PVA) being used as a hydrophilic polymer in both Example 10 and Comparative Example 5, will now be described.

The samples in Example 10 and Comparative Example 5 were prepared in accordance with the present production method described above. It is to be noted that similarly to Examples 8 and 9 and Comparative Example 4, a series of steps including step 2 and step 3 were repeated twice for increasing the thickness of the separation-functional membrane. The weights of the solvent (water), the hydrophilic polymer and the $CO_2$ carrier in the cast solution prepared in step 1 are the same between Example 10 and Comparative Example 5. In each of Example 10 and Comparative Example 5, cesium carbonate ($Cs_2CO_3$) is used as the $CO_2$ carrier, and the weight ratio of cesium carbonate to the total weight of PVA and cesium carbonate (carrier concentration) is 46% by weight. The polymerization degree of polyvinyl alcohol used is about 2000, and the porous membrane supporting the separation-functional membrane is a PTFE porous membrane having a pore size of 0.1 μm and a thickness of 50 μm.

In Example 10, potassium tellurite is used as a $CO_2$ hydration catalyst, and the molar ratio of the $CO_2$ hydration catalyst to the $CO_2$ carrier is 0.2. The sample in Comparative Example 5 was prepared in the same manner as in Example 10 except that the cast solution prepared in step 1 in the production method described above did not contain a $CO_2$ hydration catalyst.

An experiment method for evaluating membrane performance of the samples in Example 10 and Comparative Example 5 is identical to the experiment method for evaluating membrane performance of the samples in Examples 1 to 9 and Comparative Examples 1, 2 and 4 described above except for the ratio of gas components of the supply side gas, the supply side gas flow rate, the supply side pressure and the use temperature. The ratio (mol %) among $CO_2$, $H_2$ and $H_2O$ (steam) in the supply side gas supplied to the supply side chamber is $CO_2:H_2:H_2O=5.0:48.7:46.3$. The flow rate of the supply side gas is $6.14 \times 10^{-2}$ mol/min, the supply side pressure is 300 kPa (A), and the temperature of the inside of the flow type gas permeation cell is fixed at 120° C.

FIG. 7 shows a list of constitutional conditions ($CO_2$ carrier, $CO_2$ hydration catalyst, molar ratio of $CO_2$ carrier to $CO_2$ hydration catalyst, hydrophilic polymer) and membrane performance ($CO_2$ permeance, $H_2$ permeance and $CO_2/H_2$ selectivity) for separation-functional membranes of the samples in Example 10 and Comparative Example 5.

When comparison of membrane performance is made between Example 10 and Comparative Example 5, it is apparent that the $CO_2$ permeance and $CO_2/H_2$ selectivity are considerably improved. From this result, it has become evident that the effect of improving the $CO_2$ permeance due to presence of a $CO_2$ hydration catalyst in the separation-functional membrane is attained also when polyvinyl alcohol is used as the hydrophilic polymer. Accordingly, it is well conceivable that the effect of improving the $CO_2$ permeance is attained irrespective of the composition of the hydrophilic polymer. Therefore, the hydrophilic polymer that forms the separation-functional membrane of the present facilitated transport membrane is not limited to the PVA/PAA salt copolymer and polyvinyl alcohol (PVA) shown as examples in the above-mentioned embodiment.

[Second Embodiment]

A $CO_2$ separation apparatus and a $CO_2$ separation method, to which the facilitated $CO_2$ transport membrane described in the first embodiment is applied, will now be described with reference to FIGS. 9A and 9B.

Figure 9A:
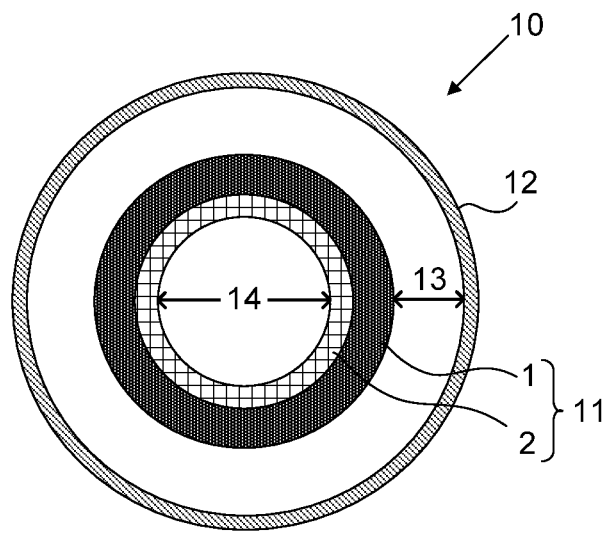
FIGS. 9A and 9B are configuration diagrams each schematically showing an outlined configuration in one embodiment of a $CO_2$ separation apparatus according to the present invention.
Figure 9B:
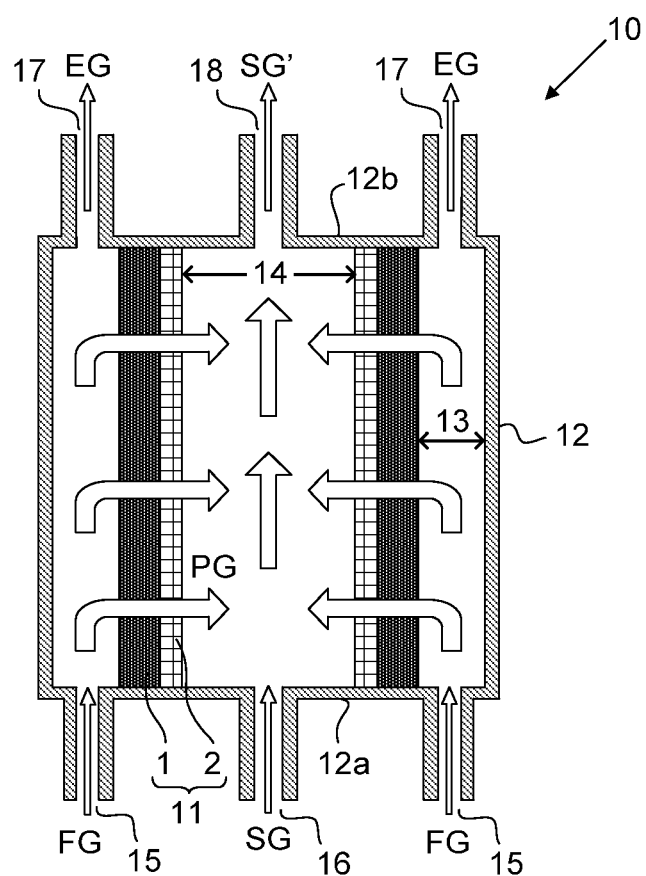

FIGS. 9A and 9B are each a sectional view schematically showing an outlined structure of a $CO_2$ separation apparatus 10 of this embodiment. In this embodiment, as an example, a facilitated $CO_2$ transport membrane modified into a cylindrical structure is used instead of the facilitated $CO_2$ transport membrane of flat plate structure described in the first embodiment. FIG. 9A shows a cross section structure at a cross section perpendicular to the axial center of a facilitated $CO_2$ transport membrane (the present facilitated transport membrane) 11 of cylindrical structure, and FIG. 9B shows a cross section structure at a cross section extending through the axial center of the present facilitated transport membrane 11.

The present facilitated transport membrane 11 shown in FIGS. 9A and 9B has a structure in which a separation-functional membrane 1 is supported on the outer circumferential surface of a cylindrical hydrophilic ceramic porous membrane 2. Similarly to the first embodiment, the separation-functional membrane 1 includes a polyvinyl alcohol-polyacrylic acid (PVA/PAA) salt copolymer as a membrane material of the separation-functional membrane, a carbonate of an alkali metal such as cesium carbonate ($Cs_2CO_3$) or rubidium carbonate ($Rb_2CO_3$) as the $CO_2$ carrier, and a tellurous acid compound, a selenious acid compound, an arsenious acid compound and an orthosilicic acid compound as the $CO_2$ hydration catalyst. The membrane structure in this embodiment is different from the membrane structure in the first embodiment in that the separation-functional membrane 1 and the hydrophilic ceramic porous membrane 2 are not held between two hydrophobic porous membranes. The method for producing the separation-functional membrane 1 and membrane performance thereof in this embodiment are basically similar to those in the first embodiment except for the above-mentioned difference, and therefore duplicate explanations are omitted.

As shown in FIGS. 9A and 9B, the present cylindrical facilitated transport membrane 11 is housed in a bottomed cylindrical container 12, and a supply side space 13 surrounded by the inner wall of the container 12 and the separation-functional membrane 1 and a permeate side space 14 surrounded by the inner wall of the ceramic porous membrane 2 are formed. A first feeding port 15 for feeding a source gas FG into the supply side space 13 and a second feeding port 16 for feeding a sweep gas SG into the permeate side space 14 are provided on one of bottom portions 12a and 12b on opposite sides of the container 12, and a first discharge port 17 for discharging a $CO_2$-separated source gas EG from the supply side space 13 and a second discharge port 18 for discharging from the permeate side space 14 a discharge gas SG' including a mixture of a $CO_2$-containing permeate gas PG passing through the present facilitated transport membrane 11 and the sweep gas SG are provided on the other of the bottom portions 12a and 12b on opposite sides of the container 12. The container 12 is made of, for example, stainless steel, and although not illustrated, the present facilitated transport membrane 11 is fixed in the container 12 with a fluororubber gasket interposed as a seal material between opposite ends of the present facilitated transport membrane 11 and the inner walls of the bottom portions 12a and 12b on opposite sides of the container 12 similarly to the experiment apparatus described in the first embodiment as an example. The method for fixing the present facilitated transport membrane 11 and the sealing method are not limited to the methods described above.

In FIG. 9B, each of the first feeding port 15 and the first discharge port 17 is provided in each of the supply side spaces 13 illustrated separately on the left and the right in FIG. 9B. However, since the supply side spaces 13 annularly communicate with each other as shown in FIG. 9A, the first feeding port 15 and the first discharge port 17 may be provided in one of the left and right supply side spaces 13. Further, FIG. 9B shows as an example a configuration in which the first feeding port 15 and the second feeding port 16 are provided on one of the bottom portions 12a and 12b, and the first discharge port 17 and the second discharge port 18 are provided on the other of the bottom portions 12a and 12b, but a configuration may be employed in which the first feeding port 15 and the second discharge port 18 are provided on one of the bottom portions 12a and 12b, and the first discharge port 17 and the second feeding port 16 are provided on the other of the bottom portions 12a and 12b. That is, the direction along which the source gases FG and EG flow and the direction along which the sweep gas SG and the discharge gas SG' flow may be reversed.

In the $CO_2$ separation method of this embodiment, the source gas FG including a mixed gas containing $CO_2$ and $H_2$ and having a temperature of 100° C. or higher is fed into the supply side space 13 and thereby supplied to the supply side surface of the present facilitated transport membrane 11, so that a $CO_2$ carrier contained in the separation-functional membrane 1 of the present facilitated transport membrane 11 is reacted with $CO_2$ in the source gas FG to allow selective passage of $CO_2$ at a high selection ratio to hydrogen, and the $CO_2$-separated source gas EG having an increased $H_2$ concentration is discharged from the supply side space 13.

The reaction of $CO_2$ with the $CO_2$ carrier requires supply of water ($H_2O$) as shown in the above reaction formula of (Chemical Formula 2), and as the amount of water contained in the separation-functional membrane 1 increases, chemical equilibrium is shifted to the product side (right side), so that permeation of $CO_2$ is facilitated. When the temperature of the source gas FG is a high temperature of 100° C. or higher, the separation-functional membrane 1 that is in contact with the source gas FG is also exposed to a high temperature of 100° C. or higher, so that water contained in the separation-functional membrane 1 is evaporated and passes into the permeate side space 14 similarly to $CO_2$, and therefore it is necessary to supply steam ($H_2O$) to the supply side space 13. The steam may be contained in the source gas FG, or may be supplied to the supply side space 13 independently of the source gas FG. In the latter case, steam ($H_2O$) passing into the permeate side space 14 may be separated from the discharge gas SG' and circulated into the supply side space 13.

For the $CO_2$ separation apparatus shown in FIGS. 9A and 9B, a configuration example has been described in which the supply side space 13 is formed at the outside while the permeate side space 14 is formed at the inside of the present cylindrical facilitated transport membrane 11, but the supply side space 13 may be formed at the inside while the permeate side space 14 may be formed at the outside. The present facilitated transport membrane 11 may have a structure in which the separation-functional membrane 1 is supported on the inner circumferential surface of the cylindrical hydrophilic ceramic porous membrane 2. Further, the present facilitated transport membrane 11 used in the $CO_2$ separation apparatus is not necessarily cylindrical, but may be in the form of a tube having a cross-sectional shape other than a circular shape, and the present facilitated transport membrane of flat plate structure as shown in FIG. 1 may be used.

As an application example of the $CO_2$ separation apparatus described in this embodiment, a shift converter ($CO_2$ permeable membrane reactor) including the present facilitated transport membrane will now be briefly described.

For example, when a $CO_2$ permeable membrane reactor is formed using the $CO_2$ separation apparatus 10 shown in FIGS. 9A and 9B, the supply side space 13 can be used as a shift converter by filling the supply side space 13 with a shift catalyst.

The $CO_2$ permeable membrane reactor is an apparatus in which, for example, a source gas FG produced in a steam reforming device and having $H_2$ as a main component is received in the supply side space 13 filled with a shift catalyst, and carbon monoxide (CO) contained in the source gas FG is removed through a CO shift reaction expressed by the above (Chemical Formula 5). $CO_2$ produced through the CO shift reaction is allowed to permeate to the permeate side space 14 selectively by means of the present facilitated transport membrane 11 and removed, whereby chemical equilibrium can be shifted to the hydrogen production side, so that CO and $CO_2$ can be removed beyond the limit imposed by equilibrium restriction with a high conversion rate at the same reaction temperature. A source gas EG freed of CO and $CO_2$ and having $H_2$ as a main component is taken out from the supply side space 13.

Since the performance of the shift catalyst used for the CO shift reaction tends to decrease with a decrease in temperature, the use temperature is considered to be 100° C. at minimum, and the temperature of the source gas FG supplied to the supply side surface of the present facilitated transport membrane 11 is 100° C. or higher. Therefore, the source gas FG is adjusted to a temperature suitable for catalytic activity of the shift catalyst, then fed into the supply side space 13 filled with the shift catalyst, subjected to the CO shift reaction (exothermic reaction) in the supply side space 13, and supplied to the present facilitated transport membrane 11.

On the other hand, the sweep gas SG is used for maintaining the driving force for the permeation through the present facilitated transport membrane 11 by lowering the partial pressure of the $CO_2$-containing permeate gas PG which permeates the present facilitated transport membrane 11 and for discharging the permeate gas PG to the outside. It is to be noted that when the partial pressure of the source gas FG is sufficiently high, it is not necessary to feed the sweep gas SG because a partial pressure difference serving as the driving force for permeation is obtained even if the sweep gas SG is not fed. As a gas species used for the sweep gas, steam ($H_2O$) can also be used as in the case of the experiment for evaluation of membrane performance in the first embodiment, and further an inert gas such as Ar can also be used. The sweep gas SG is not limited to a specific gas species.

[Other Embodiments]

Hereinafter, other embodiments will be described.

<1> The above-mentioned embodiments have been described based on the assumption that a carbonate, a bicarbonate or a hydroxide of an alkali metal such as cesium or rubidium is used as a $CO_2$ carrier. However, since the present invention is characterized in that a hydrophilic polymer gel membrane that forms a separation-functional membrane contains a $CO_2$ carrier and a $CO_2$ hydration catalyst having catalytic activity at a high temperature of 100° C. or higher, the $CO_2$ carrier is not limited to a specific $CO_2$ carrier as long as it is such a $CO_2$ carrier that a reaction of $CO_2$ with the $CO_2$ carrier can be accelerated by a $CO_2$ hydration catalyst to attain membrane performance comparable to or higher than the membrane performance (selective permeability of $CO_2$ to hydrogen) shown as an example in the first embodiment.

<2> The above-mentioned embodiments have been described based on the assumption that the $CO_2$ hydration catalyst contains at least one of a tellurous acid compound, a selenious acid compound, an arsenious acid compound, an orthosilicic acid compound and a molybdic acid compound, but the $CO_2$ hydration catalyst is not limited to a specific $CO_2$ hydration catalyst as long as it is a $CO_2$ hydration catalyst which has catalytic activity for the $CO_2$ hydration reaction of the above (Chemical Formula 1) at a high temperature of 100° C. or higher, preferably 130° C. or higher, more preferably 160° C. or higher and which can attain membrane performance comparable to or higher than the membrane performance (selective permeability of $CO_2$ to hydrogen) shown as an example in the first embodiment when combined with a $CO_2$ carrier. When used in the separation-functional membrane of the present facilitated transport membrane, the $CO_2$ hydration catalyst is preferably one that has a melting point of 200° C. or higher and is soluble in water similarly to the above-mentioned compounds. While the upper limit of the range of temperatures at which the $CO_2$ hydration catalyst exhibits catalytic activity is not particularly limited, there is no problem as long as it is higher than the upper limit of the range of temperatures such as the use temperature of the present facilitated transport membrane in an apparatus including the present facilitated transport membrane, and the temperature of a source gas supplied to the supply side surface of the present facilitated transport membrane. The hydrophilic porous membrane or the like that forms the present facilitated transport membrane is also required to have resistance in a similar temperature range as a matter of course. When the present facilitated transport membrane is used at a temperature lower than 100° C., the $CO_2$ hydration catalyst is not necessarily required to have catalytic activity at a high temperature of 100° C. or higher.

<3> In the first embodiment, the present facilitated transport membrane is prepared by a method in which a cast solution including an aqueous solution containing a hydrophilic polymer (PVA/PAA salt copolymer, polyvinyl alcohol (PVA) or the like), a $CO_2$ carrier and a $CO_2$ hydration catalyst is cast on a hydrophilic PTFE porous membrane, and then gelled, but the present facilitated transport membrane may be prepared by a preparation method other than the above-mentioned preparation method. For example, the present facilitated transport membrane may be prepared by forming a hydrophilic polymer gel membrane that does not contain a $CO_2$ carrier and a $CO_2$ hydration catalyst, followed by impregnating the gel membrane with an aqueous solution containing a $CO_2$ carrier and a $CO_2$ hydration catalyst.

<4> In the first embodiment, the present facilitated transport membrane has a three-layer structure including a hydrophobic PTFE porous membrane, a separation-functional membrane supported on a hydrophilic PTFE porous membrane and a hydrophobic PTFE porous membrane, but the support structure of the present facilitated transport membrane is not limited to such a three-layer structure. For example, the present facilitated transport membrane may have a two-layer structure including a hydrophobic PTFE porous membrane and a separation-functional membrane supported on a hydrophilic PTFE porous membrane. In the first embodiment, a case has been described where the separation-functional membrane is supported on the hydrophilic PTFE porous membrane, but the separation-functional membrane may be supported on the hydrophobic PTFE porous membrane.

<5> In the second embodiment, a $CO_2$ permeable membrane reactor has been described as an application example of the $CO_2$ separation apparatus including the present facilitated transport membrane, but the $CO_2$ separation apparatus including the present facilitated transport membrane can also be used in a decarbonation step in a hydrogen production process other than that in the membrane reactor, and is further applicable to processes other than the hydrogen production process, and the $CO_2$ separation apparatus is not limited to the application example shown in the above-mentioned embodiment. The supply side gas (source gas) supplied to the present facilitated transport membrane is not limited to the mixed gas shown as an example in the above-mentioned embodiments.

<6> The mixing ratios of the components in the composition of the present facilitated transport membrane, the dimensions of the portions of the membrane and the like as shown as examples in the above-mentioned embodiments are examples given for easy understanding of the present invention, and the present invention is not limited to facilitated $CO_2$ transport membranes having such values.

INDUSTRIAL APPLICABILITY

A facilitated $CO_2$ transport membrane according to the present invention can be used for separating $CO_2$ from a mixed gas including $CO_2$ and $H_2$ at a high selection ratio to hydrogen in a decarbonation step in a hydrogen production process, a $CO_2$ permeable membrane reactor, and so on, and is useful particularly for separation of $CO_2$ at a high temperature of 100° C. or higher.

DESCRIPTION OF SYMBOLS 1 separation-functional membrane
2 hydrophilic porous membrane
3, 4 hydrophobic porous membrane
10 $CO_2$ separation apparatus
11 facilitated $CO_2$ transport membrane
12 container
12a, 12b bottom portion (upper bottom portion and lower bottom portion) of container
13 supply side space
14 permeate side space
15 first feeding port
16 second feeding port
17 first discharge port
18 second discharge port
FG source gas
EG $CO_2$-separated source gas
PG permeate gas
SG, SG' sweep gas

The invention claimed is:

1. A facilitated $CO_2$ transport membrane comprising a separation-functional membrane that includes a hydrophilic polymer gel membrane containing a $CO_2$ carrier and a $CO_2$ hydration catalyst, wherein the $CO_2$ hydration catalyst is an oxo acid compound of at least one element selected from group 6 elements and group 14 elements.

2. The facilitated $CO_2$ transport membrane according to claim 1, wherein the $CO_2$ hydration catalyst has catalytic activity at a temperature of 100° C. or higher.

3. The facilitated $CO_2$ transport membrane according to claim 1, wherein the $CO_2$ hydration catalyst has a melting point of 200° C. or higher.

4. The facilitated $CO_2$ transport membrane according to claim 1, wherein the $CO_2$ hydration catalyst is soluble in water.

5. The facilitated $CO_2$ transport membrane according to claim 1, wherein the $CO_2$ hydration catalyst contains at least an orthosilicic acid compound.

6. The facilitated $CO_2$ transport membrane according to claim 1, wherein the $CO_2$ hydration catalyst contains a molybdic acid compound.

7. The facilitated $CO_2$ transport membrane according to claim 1, wherein the gel membrane is a hydrogel.

8. The facilitated $CO_2$ transport membrane according to claim 1, wherein the gel membrane is a polyvinyl alcohol-polyacrylic acid salt copolymer gel membrane.

9. The facilitated $CO_2$ transport membrane according to claim 1, wherein the $CO_2$ carrier contains at least one of a carbonate of an alkali metal, a bicarbonate of an alkali metal and a hydroxide of an alkali metal.

10. The facilitated $CO_2$ transport membrane according to claim 9, wherein the alkali metal is cesium or rubidium.

11. The facilitated $CO_2$ transport membrane according to claim 1, wherein the separation-functional membrane is supported on a hydrophilic porous membrane.

12. A method for producing the facilitated $CO_2$ transport membrane according to claim 1, the method comprising the steps of:
preparing a cast solution including an aqueous solution containing the hydrophilic polymer, the $CO_2$ carrier and the $CO_2$ hydration catalyst that is an oxo acid compound of at least one element selected from group 6 elements and group 14 elements and is soluble in water; and
casting the cast solution on a hydrophilic porous membrane and then gelling the cast solution to prepare the separation-functional membrane.

13. A method for separating $CO_2$ using a facilitated $CO_2$ transport membrane, the facilitated $CO_2$ transport membrane comprising a separation-functional membrane that includes a hydrophilic polymer gel membrane containing a $CO_2$ carrier with a $CO_2$ hydration catalyst having catalytic activity at a temperature of 100° C. or higher, wherein a mixed gas containing $CO_2$ and $H_2$ and having a temperature of 100° C. or higher is supplied to a supply side of the facilitated $CO_2$ transport membrane and the $CO_2$ passing through the facilitated $CO_2$ transport membrane is separated from the mixed gas and, wherein the $CO_2$ hydration catalyst is an oxo acid compound of at least one element selected from group 6 elements and group 14 elements.

14. The method of claim 13, wherein the mixed gas containing $CO_2$ and $H_2$ and having a temperature of 100° C. or higher is supplied to a supply side of the facilitated $CO_2$ transport membrane under a condition that a pressure difference between the supply side and a permeate side of the facilitated $CO_2$ transport membrane is not less than 200kPa.

15. A $CO_2$ separation apparatus comprising a facilitated $CO_2$ transport membrane, the facilitated $CO_2$ transport membrane comprising a separation-functional membrane that includes a hydrophilic polymer gel membrane containing a $CO_2$ carrier and a $CO_2$ hydration catalyst having catalytic activity at a temperature of 100° C. or higher, wherein the apparatus is configured to supply a mixed gas containing $CO_2$ and $H_2$ and having a temperature of 100° C. or higher to a supply side of the facilitated $CO_2$ transport membrane and the $CO_2$ passing through the facilitated $CO_2$ transport membrane is separated from the mixed gas and, wherein the $CO_2$ hydration catalyst is an oxo acid compound of at least one element selected from group 6 elements and group 14 elements.

16. The apparatus of claim 15, wherein the apparatus is configured to supply the mixed gas containing $CO_2$ and $H_2$ and having a temperature of 100° C. or higher is supplied to a supply side of the facilitated $CO_2$ transport membrane under a condition that a pressure difference between the supply side and a permeate side of the facilitated $CO_2$ transport membrane is not less than 200kPa.

* * * * *